(12) United States Patent
Bröse et al.

(10) Patent No.: US 7,890,817 B2
(45) Date of Patent: Feb. 15, 2011

(54) PROTECTIVE SYSTEM FOR AN INSTALLATION AND A METHOD FOR CHECKING A PROTECTIVE SYSTEM

(75) Inventors: Jörg Bröse, Nürnberg (DE); Michael Knörlein, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 512 days.

(21) Appl. No.: 12/001,948

(22) Filed: Dec. 13, 2007

(65) Prior Publication Data

US 2008/0148112 A1 Jun. 19, 2008

(30) Foreign Application Priority Data

Dec. 15, 2006 (EP) ................................ 06026083

(51) Int. Cl.
*G06F 11/26* (2006.01)
*G06F 11/36* (2006.01)

(52) U.S. Cl. ........................ 714/703; 714/712

(58) Field of Classification Search ........................ None
See application file for complete search history.

(56) References Cited

U.S. PATENT DOCUMENTS 3,471,749 A * 10/1969 Harris .......................... 361/59
3,922,587 A * 11/1975 Jones .......................... 361/159
5,201,296 A * 4/1993 Wunning et al. ............. 123/479
5,206,810 A * 4/1993 Bools et al. .................. 701/100
5,511,223 A * 4/1996 Scecina et al. ................. 714/36
6,621,270 B2 * 9/2003 Johnson et al. .............. 324/418

FOREIGN PATENT DOCUMENTS

| DE | 33 09 431 A1 | 9/1984 |
| EP | 0 573 186 A2 | 12/1993 |
| EP | 1 308 803 A1 | 5/2003 |
| EP | 1308803 A1 * | 5/2003 |
| JP | 60 069216 A | 4/1985 |
| JP | 60 219403 A | 11/1985 |
| JP | 06303720 A * | 10/1994 |

* cited by examiner

*Primary Examiner*—Jeffrey A Gaffin
*Assistant Examiner*—Dipakkumar Gandhi

(57) ABSTRACT

The invention relates to a protective system for an installation, in particular for a gas-turbine installation, in which all the fail-safe protective circuits with reaction time requirements of greater than 50 milliseconds are routed via a more fail-safe programmable logic automation system. For all the other protective circuits with reaction time requirements of less than 50 milliseconds, fail-safe control relays are connected in a configuration which is tolerant to single faults, in which the automation system can check the operation of the control relay circuit cyclically during operation of the installation.

20 Claims, 1 Drawing Sheet

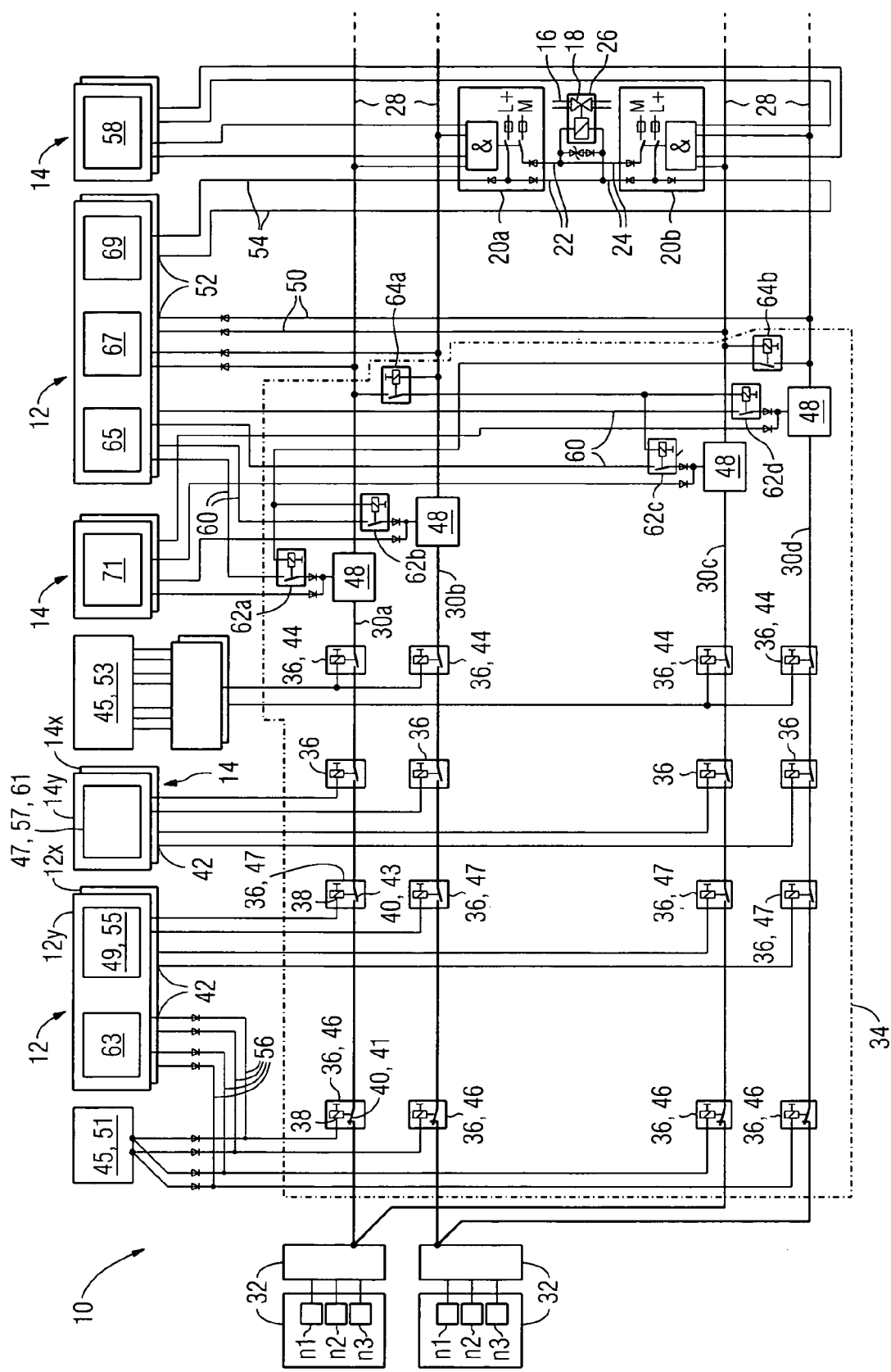

PROTECTIVE SYSTEM FOR AN INSTALLATION AND A METHOD FOR CHECKING A PROTECTIVE SYSTEM

CROSS REFERENCE TO RELATED APPLICATIONS

This application claims the benefits of European application No. 06026083.3 filed Dec. 15, 2006, and is incorporated by reference herein in its entirety.

FIELD OF INVENTION

The invention relates to a protective system, and to a method for checking a protective system as claimed in the claims.

BACKGROUND OF THE INVENTION

Electrical and electronic protective systems for installations are generally known. For example, laid-open specification DE 33 09 431 A1 discloses a protective system for a turbine set, whose rapid closure or bypass valves are equipped with electro-hydraulic actuating and switching drives. The drives have means for reception of electrical drive signals, by which means valves or other actuating members of a turbine set are operated. The drive signals are in this case generated by an appliance system which is a part of the electrical protective system, possibly with the interposition of an amplifier. In order to increase the availability, the appliance system comprises two identical programmable logic central units, each having an input/output peripheral. Depending on the requirement, the inputs/outputs may have a single channel, or two channels, for redundancy reasons. The two internal bus systems of the appliances are continuously monitored for non-equivalence by means of fail-safe comparator assemblies. If they are not equivalent, a system fault is present, which switches off the drive for the safety fittings of the installation, thus protecting it.

During operation of the turbine set, the inputs are recorded operating parameters which can in this case be subdivided into two groups, on the one hand into highly time-critical protective criteria, and on the other hand into less time-critical protective criteria. In this case, one protective circuit is provided for each of the protective criteria in the protective system.

The highly time-critical protective criteria are those which require a spontaneous reaction or a reaction as quickly as possible, that is to say shut-down, if their measured values are outside a permissible range. These criteria include, for example, the rotation speed of the turbine set, the generator block protection and the compressor surge monitoring. For these stated criteria, a reaction should take place within a maximum of 50 milliseconds after the occurrence of the defect. In other words, operating states which endanger the installation should be identified by the protective system after their occurrence and should reliably lead, within 50 milliseconds, to quick shut-down of the installation, initiated by the protective system. This process is also referred to as tripping.

Less time-critical protective criteria include operating parameters whose faults allow longer reaction times. Examples of less time-critical protective criteria are the bearing oil pressure, the turbine temperature protection, the bearing vibration and the bearing temperature. Reaction times of considerably more than 50 milliseconds are acceptable in this case.

In order to comply with the short reaction times of a maximum of 50 milliseconds, specific programmable logic automation systems have until now been used as appliance systems. These have the capability for interrupt processing of signals. This interrupt processing was intended for highly time-critical protective criteria, that is to say highly critical operating parameters relating to the installation. Interrupt processing made it possible to ensure the required reaction times since the signals relating to the highly time-critical protective criteria could be in this way processed with preference (with priority) by the automation system. The endlessly executed commands in the internally stored program procedure in the automation system were therefore interrupted in real time after the occurrence of an interrupt signal. In consequence, it was possible to implement the highly time-critical turbine protection circuits by means of an automation system such as this without having to interpose further control components between the automation system and the actuating members and/or their electrical drive.

More recent subsequent systems, which are now available on the market, of automation systems now no longer offer the capability for interrupt processing of highly critical operating parameters. These highly time-critical protective criteria can therefore no longer be processed with priority when using an automation system such as this, but only when the internally stored program procedure provides for this to be done in the programmable logic automation system. When using automation systems without interrupts, the required reaction times for protection of the turbine set can now no longer be complied with any guarantee, which means that interrupt-free automation systems appear to be unsuitable for use in protective systems of the type mentioned above.

Instead of using programmable logic fail-safe automation systems, it is also known for fail-safe protection circuits to be designed for highly time-critical and less time-critical protective criteria by means of pure relay assemblies. The relay assemblies are electrical circuits in which a multiplicity of relays are connected to one another to form the protection circuit. Although these relay assemblies achieve the required reaction times, they have a low diagnosis coverage level. This means that any faults which occur in the relay assembly or in the circuitry of the relay assembly, such as potential shorts, can be detected only inadequately. As a result of this low diagnosis coverage level of relay assemblies, they must be checked for serviceability by repeated tests, which have to be carried out manually. The testing is normally the responsibility of the power station operator of the turbine set, and, furthermore, this can be carried out only with the turbine set shut down. The repeated manual tests therefore represent more stringent requirements relating to the care and specialist knowledge of the power station operators, with the requirements for repeated testing further exacerbating the acceptance, which is already low in any case, for the use of relay assemblies. Furthermore, entirely untested relay assemblies have a comparatively high failure probability which can lead to machine damage and consequential damage when they have to be used (for quick shut-down) with the turbine set.

SUMMARY OF INVENTION

The object of the present invention is therefore to provide a protective system for an installation which has very short reaction times for quick shut-down of the installation while using an automation system without interrupts, with the aim of the protective system requiring particularly little maintenance. A further aim is to specify a method for checking a protective system which requires particularly little maintenance and is therefore maintenance-friendly.

The object relating to the protective system is achieved by a protective system as claimed in the claims.

In a protective system of the type mentioned initially, a control relay circuit having at least one control relay is provided, via which control relay circuit the operating signals of further operating parameters can be passed to the load control unit, wherein the control relay circuit can be checked by the automation system. The first operating parameters are preferably less time-critical protective criteria for the installation, and the further operating parameters are highly time-critical protective criteria for the installation.

The invention is based on the discovery that, despite the use of an automation system without interrupts, the required, very short reaction times of less than 50 milliseconds can be achieved if further operating parameters, preferably the highly time-critical protective criteria, are routed via a control relay circuit rather than via the automation system, in order in this way to make it possible to influence the actuating members in the installation. Those protective circuits which have reaction time requirements of greater than 50 milliseconds are therefore passed via the automation systems. In consequence, this applies to the less time-critical protective criteria. A control relay circuit is provided for protection circuits with reaction time requirements of less than 50 milliseconds, that is to say for the highly time-critical protective criteria.

The use of a control relay circuit having at least one control relay and its electrical connection as a protection circuit are envisaged exclusively for the highly time-critical protective criteria. The less time-critical protective criteria are recorded and processed by the interrupt-free automation system since it is not absolutely essential for them to be processed as quickly as possible, within 50 milliseconds. However, because the control relay circuit does not have immanent diagnosis coverage, the automation system is designed to be fail-safe and is connected to the control relay circuit such that both the function of the control relays and that of their wiring can be checked by the automation system.

Instead of manual testing, an automated test carried out by the fail-safe automation system is now envisaged, which is more cost-effective and can be carried out with less effort. The test can in this case also be carried out cyclically by the automation system. Electrical faults and potential shorts within the control relay circuit which may occur between the tests can therefore be determined more quickly, thus making it possible to avoid unnecessary quick tripping of the installation and potential protective failure. On the one hand, this saves the operator maintenance costs and on the other hand saves the operator the costs which would be incurred by unnecessary quick shut-down.

Overall, ensuring the fault-free availability of the relay circuit leads to faults being identified and signaled in real time, thus making it possible to ensure reliable operation of the installation. When faults occur, they can be identified in good time by use of the protective system according to the invention and by carrying out the test procedure, and they can be rectified by reasonable measures.

Advantageous refinements are specified in the dependent claims.

In order to achieve a standard drive for the load control units via operating signals of highly time-critical and less time-critical protective criteria, the coupling between the signal outputs of the automation system and the load control unit is produced indirectly via the control relay circuit, which has further control relays for this purpose.

In order to form availability redundancy, a pair of load control units which can be operated separately and have a respective tripping line are preferably provided, and the tripping lines are linked to the actuating element in the form of an OR logic operation. For this purpose, the signals of the respective protection circuits are passed via separate signal chains to in each case one of the two load control units. When the installation is being operated without any faults, voltage signals and/or current signals are applied to the inputs of the respective load control unit, based on the principle of closed-circuit current. The installation is then switched off automatically only when both tripping lines have responded as a result of a faulty operating state, which in each case leads to a "voltage-free" or "current-free" signal at one of the inputs of the respective load control unit, after which the actuating element is switched off in order to disconnect the installation. If only one of the two tripping lines has responded, this indicates a fault in one of the signal chains. Spurious tripping can be avoided by the use of a protection circuit design such as this.

The control relay circuit preferably has at least one closed-circuit line as part of the signal chain, in which one or more switching elements are provided from the control relays in the control relay circuit, and which closed-circuit line is connected to one input of the load control unit. The closed-circuit line, which operates on the closed-circuit current principle, in principle allows operating parameters to be monitored on a highly time-critical basis and on a less time-critical basis to be connected in series. The operating parameters to be monitored are actively monitored by the use of the closed-circuit current principle. Passive electrical or electromechanical faults can be identified immediately when they occur in the closed-circuit line, thus avoiding undetected faults.

In order to form safety redundancy, it is particularly preferable for each load control unit to have two separate closed-circuit lines on the input side, which are logically linked in the form of an AND logic operation in the load control unit. A refinement such as this considerably increases the safety of the control relay circuit since only one of the two closed-circuit lines need indicate faulty operation of the installation in order to switch off the associated tripping line via the downstream load control unit.

If the protective system has two tripping lines, each with two closed-circuit lines, this results in a protective system which is tolerant to single faults. A fault within the closed-circuit lines leads neither to failure of the protective system nor to spurious response of the protective function. Furthermore, the closed-circuit lines and the downstream load control unit can be checked for faults during operation of the installation.

According to a further positive refinement, the control relay circuit in each case has a control relay, which in each case has an exciter input and at least one switching element, per operating signal to be monitored and per closed-circuit line, with the exciter input being connected to that signal output of the automation system which is associated with the respective operating signal, and with one of its switching elements being provided in the closed-circuit line.

It is particularly advantageous for a series relay with an exciter input and with at least one switching element to be provided for each closed-circuit line. The switching element is provided in the respective closed-circuit line, and the exciter input is connected to a signal output of the automation system, in order to supply a test signal, to which can be predetermined by the automation system, the closed-circuit line. This refinement makes it possible to apply a test signal individually and successively in time to each closed-circuit line, with this test signal being produced by opening the switching element located in the closed-circuit line. In this case, the intention is for the switching element of the series relay to be arranged within the closed-circuit line on the input side, that is to say between a feed and the switching elements for further control relays. An arrangement such as this results in the capability to check the entire current path of the closed-circuit line—from the feed to the load control unit. The current path is in this case formed by the wiring and other switching elements of the control relays.

In one preferred refinement, in order to feed back the test signal to the automation system, that line section of the relevant closed-circuit line, which line section is connected directly to the input of the load control unit, is connected to a signal input of the automation system. In consequence, the test signal that is tapped off from the closed-circuit line is therefore recorded as far away as possible on the feed side from the automation system, in order to allow checking of the switching elements which are located between the feed points for the test signal and this tapping, as well as their wiring. This allows the state of the closed-circuit line under consideration to be monitored in its entirety by the automation system.

In one further advantageous refinement, the relevant tripping line is connected to a signal input of the automation system for signal feedback to the automation system. In particular, this allows the test signal to be fed back. Since the test signal is also used to drive the load control unit, its serviceability can also be checked by means of the test signal. All that is required to do this is to connect the tripping line to one of the signal inputs of the automation system in order to provide the (test) signal transmitted via this to the actuating element, to the automation system for evaluation.

In order to ensure reliable and sustained shut-down of the load control units when using very short tripping signals with the tripping lines, and in order to compensate for and to synchronize the possible delay of signals of different closed-circuit lines resulting from different delay times within the automation system and within the control relay circuit, a tripping line is provided on the tripping memory in each closed-circuit line. This is preferably arranged between the switching elements of the control relays and the load control unit. The signals which are carried in the closed-circuit line are buffer-stored by the tripping memory, in particular the "zero-current" signal, in order to make it possible when the protective system is being operated correctly for shut-down impulses which are offset even only slightly in time to be used to decide whether to initiate quick shut-down of the installation.

Since the tripping memory also changes its state after generation of a test signal, the tripping memory should also be capable of being reset by a reset signal from the automation system. There is then no longer any need for manual acknowledgement of the test signal.

For the improbable case of tripping of the protective system in accordance with regulations during the checking phase, it is particularly advantageous for the automatic resetting of the tripping memory to be blocked in this case. This therefore reliably avoids automatic acknowledgement of shut-down of the installation in accordance with the regulations. Tripping identification relays and reset enable relays are provided for this purpose in the protective system, and block the resetting of the tripping memory in the abovementioned case. In an availability-redundant protective system, the input sides of these relays are connected to those closed-circuit lines which are not associated with the load control unit arranged downstream from the tripping memory. Specifically, the shut-down signal in accordance with the regulations is passed via one of these closed-circuit lines to that load control unit via which the actuating element was still connected to the supply voltage before tripping. Absence of the closed-circuit current on one of these closed-circuit lines therefore indicates tripping in accordance with the regulations, and this is used at the same time to block the automatic resetting of the tripping memory.

The object relating to the method for testing a protective system is achieved by the control relay circuit being checked by one of the automation systems in the protective system. Since the protective system comprises a fail-safe automation system in any case, this can be used as a fail-safe part of the protective system to check the part which is more susceptible to faults—specifically the control relay circuit. In its fail-safe function, the protective system is therefore continuously self-checking, even with respect to its control relay circuit.

The method can preferably be carried out on a protective system as claimed in the claims. The method can also be carried out during operation of the installation by designing the protective system as claimed in the claims, with the task steps a) to d) being carried out in order to check one of the closed-circuit lines:

a) checking that tripping line which is not connected downstream from the closed-circuit line which is intended to be checked, to determine whether this is supplying electrical voltage to the actuating element, b) if the actuating element is being supplied with electrical voltage, the automation system produces a test signal at t=0 seconds by means of one of the relays for that closed-circuit line which is intended to be checked, c) recording of the signal profile of the closed-circuit line or of the signal profile of the tripping line by the automation system, and d) determination of the state of the control relay circuit by the automation system by assessment of the recorded signal profile over time.

When the control relay circuit is fault-free, the test signal which is supplied as close to the feed point as possible in the closed-circuit line is intended to propagate through the control relay circuit and to be recorded within the required maximum period at the output of the closed-circuit line, that is to say upstream of the load control unit, via the automation system. The test signal should preferably be generated by driving the series relay by means of the automation system. If the delay time of the test signal requires a maximum period, then it can be assumed that the control relay circuit is faulty, resulting in an appropriate defect message and requiring maintenance measures. If the automation system receives the test signal response from the control relay circuit within the predetermined maximum period, then the tested closed-circuit line can be classified as fault-free.

The maximum period between the test signal start and the time to determine whether the test signal is being fed back is recorded at the correct time or later by the automation system is preferably 0.5 seconds, in particular 0.3 seconds.

Provided that the protective system is designed to be safety-redundant and availability-redundant (tolerant to single faults), the testing of one of the closed-circuit lines can also be carried out during operation of the installation. It is normally sufficient to test the closed-circuit lines on a six-monthly cycle. Since gas-turbine installations are very rarely operated for more than six months without interruption, it is generally sufficient to ensure fault-free wiring and operation of a control relay circuit to carry out the test during the starting phase or the shutting-down phase of the installation. Shorter or longer cycles are also feasible for other turbine sets or methods of operation. Because of the safety-redundant and availability-redundant design of the protective system, the transmission of the test signal to one of the closed-circuit lines does not lead to quick shut-down of the installation. Two of the closed-circuit lines must have equivalent shut-down signals ("zero-current") for quick shut-down of the installation, and these two closed-circuit lines must each act on both control relay circuits in a pair. If necessary, the test can therefore in principle also be carried out during operation of the turbine set. If a fault in the control relay circuit is found as a result of the test, then this can also be rectified during operation of the installation, if the protective system is designed to be safety-redundant and availability-redundant.

BRIEF DESCRIPTION OF THE DRAWINGS

One preferred exemplary embodiment of the invention is illustrated in the drawing and will be explained in more detail in the following description.

The single FIGURE shows a schematic circuit of a fail-safe, high-availability protective system for an installation.

The single FIGURE shows the partially schematic circuit diagram of an electrical protection system 10 for an installation which is not illustrated. By way of example, the installation may be a turbine set for a gas-turbine installation. The protective system for a gas-turbine installation will be described in the following text.

The general object of the protective system is to record operating parameters during operation of the gas-turbine installation and to shut down the gas-turbine installation as quickly as possible when an operating state occurs which may result in damage. This unplanned shut-down as quickly as possible is in general also referred to as a quick shut-down or else as tripping.

DETAILED DESCRIPTION OF INVENTION

In this case, the protective system 10 must satisfy two partially contradictory requirements as optimally as possible. On the one hand, high tripping reliability is required, that is to say correct shut-down of the gas-turbine installation in the event of a fault, while on the other hand the electrical protective system 10 should have high availability in order to avoid unnecessary spurious tripping and spurious shut-down.

The protective system 10 has two automation systems 12, 14, which are each illustrated distributed in a plurality of functional blocks. The automation system 12 is a fail-safe automation system 12 without the capability for interrupt processing and is intended for the less time-critical, but fail-safe protective criteria. The automation system 14, in contrast, may be a non-fail-safe automation system 14 since signals from protective criteria which are only less time-critical are processed by this automation system, in a manner which is not fail-safe.

For safety reasons, each automation system 12, 14 has two automation devices of redundant design, with the automation systems 12, 14 each being provided with the suffices "x" and "y" in order to distinguish between them.

The gas-turbine installation is shut down by closing at least one valve 18, which is arranged in a fuel line 16. The fuel supply can thus be interrupted, assuming that the valve is provided in the overall supply line. However, gas-turbine installations normally have a separate fuel line 16 for each burner, so that a valve 18 is connected in each of the fuel lines 16. In order to shut down the gas-turbine installation, all the valves 18 must then be closed. For clarity reasons, however, only one of the valves 18 is shown in the single FIGURE.

The valve 18 and its electrical drive represent an actuating element 26 for the protective system, which can be operated by a load control unit 20. In the envisaged embodiment, the load control unit 20 is in the form of a fail-safe valve switching amplifier.

In order to form availability redundancy, a pair of load control units 20a, 20b which can be operated separately are provided for each valve 18. The reference symbols 20 have the suffices "a" and "b" in order to distinguish between the individual load control units 20 in the illustrated pair. 20 is used on its own where the reference is not to one explicit load control unit.

The output side of the load control unit 20a is connected to the actuating element 26 via a tripping line 22, and the load control unit 20b is connected to the actuating element 26 via a tripping line 24. The two load control units 20 are in this case connected to the actuating element 26 in the form of an OR logic link. As long as at least one of the two load control units 20a (or 20b) connects a supply voltage to the actuating element 26 via one of the tripping lines 22 (or 24), the valve 18 remains in the open position, thus maintaining operation of the gas-turbine installation. In order to shut down the gas-turbine installation, both load control units 20a and 20b in the pair must disconnect the voltage supply from the actuating element 26.

Each of the two load control units 20a, 20b in the pair is connected on the input side inter alia to an output 28 of a closed-circuit line 30. However, as illustrated, two closed-circuit lines 30 are provided for each load control unit 20 of the pair in order to form safety redundancy, and are logically linked in each load control unit 20a and 20b in the form of an AND logic operation. A total of four closed-circuit lines 30 are therefore provided, whose reference symbols have the suffices "a", "b", "c" or "d" in order to distinguish between them.

Four closed-circuit lines 30 are provided, irrespective of how many actuating elements 26 and valves 18 there are in the installation. If, for example, the gas-turbine installation has fourteen burners, each with a separate fuel line 16 in each of which a valve 18 is provided as the actuating element 26, then a further pair of load control units 20a and 20b are provided for each actuating element 26. This then results in a total of twice fourteen parallel connected load control units 20a (or 20b) being connected on the input side to the respective two closed-circuit lines 30a, 30b (or 30c, 30d) of the four closed-circuit lines 30.

The input side of each closed-circuit line 30 is connected to an overspeed protective system 32, which is likewise provided in the redundant form, that is to say duplicated, for safety reasons. The overspeed protection systems 32 feed an electrical voltage or an electric current in this case into the closed-circuit lines 30, which operate on the principle of closed-circuit current.

Each closed-circuit line 30 represents a part of a control relay circuit 34 which also has a plurality of fail-safe control relays 36. The control relays 36 in this case each have an exciter input 38 and electromagnetically operable switching elements 40, for example a break contact 41 or make contact 43, which are arranged in the closed-circuit lines 30. Within each closed-circuit line 30, the switching elements 40 of highly time-critical protective circuits 45 and less time-critical protective circuits 49 are connected in series, with the safety-redundant and availability-redundant structure of the protective system 10 resulting in a matrix-like arrangement of the control relays 36. The exciter input 38 of the control relays 36 is connected to one of the signal outputs 42 of the automation system 12 or 14, and can therefore influence the signals being carried in the relevant closed-circuit lines 30.

The switching element 40, which is in the form of a break contact 41, of a series relay 46 is in each case provided for each closed-circuit line 30 between the feed point to the overspeed protective system 32 and the switching elements 40 of the control relays 36. The series relays 46 are used mainly as safety elements for a so-called block protection circuit 51, which operates on the open-circuit principle.

A separate tripping memory 48 is provided in each closed-circuit line 30 and is arranged between the output 28 of the closed-circuit line 30 and the switching elements 40 associated with that closed-circuit line. The output of the tripping memory 48 represents the output 28 of the closed-circuit line 30 and is connected to the inputs of the load control units 20. The tripping memories 48 store the signals recorded by them on their input sides until reception of a reset or acknowledgement signal.

The automation systems 12, 14 have a plurality of signal inputs, which are not illustrated explicitly but some of which are intended to receive signals from installation operating parameters to be monitored. The automation systems 12, 14 can indirectly control the gas-turbine installation via the signal outputs 42. The indirect control is in this case provided via the downstream control relay circuit 34, its closed-circuit lines 30 and via the load control units 20.

In order to achieve the required reaction times of less than 50 milliseconds for highly time-critical protective criteria, the signals of these operating parameters act directly on the closed-circuit lines via control relays 44 which are provided for this purpose, with this once again being based on the closed-circuit principle. This is illustrated, by way of example, for the protection circuit 53 for the highly time-critical protective criteria of "compressor surge protection". In other words, the signals of the operating parameters for highly time-critical protective criteria are not passed via the automation systems 12, 14. In addition to compressor surge protection 53, further highly time-critical protective criteria which are not mentioned here can be included in the same manner in the control relay circuit 34 for the protective system 10.

When the gas-turbine installation is in operation, and is being operated without any fault, an electric current flows on the closed-circuit line 30 and an electrical voltage is applied to the closed-circuit line 30. A defect in the closed-circuit line 30 can be indicated by an interruption in the closed-circuit line 30. The interruption of the current flow may be caused, for example, by the automation system 12, 14 if the control relays 36, which are equipped with make contacts 43, are switched to the unenergized state by one of the automation systems 12, 14.

Overall, the illustrated circuit represents a high-availability quick-closure tripping chain, which is tolerant to single faults, as a protective system 10 for a gas-turbine installation, and which operates as follows: as long as at least one of the load control units 20a or 20b is supplying voltage on its output side to the actuating element 26, the installation can still be operated. In order to shut down the voltage supply for the actuating element 26 totally via that of the load control units 20a and 20b in the event of a malfunction, there must be no voltage on the output side of at least two of the closed-circuit lines 30a (or 30b) and 30c (or 30d).

For this purpose, the closed-circuit lines 30a (or 30b) and 30c (or 30d) of the control relay circuit 34 which are live in the sound, fault-free state must be interrupted. For this purpose, the switching elements 40 of the control relays 36 are included in the closed-circuit lines 30. If a break contact 41 is included as a switching element 40 in the closed-circuit line 30, the control relay 36 must be operated in order to interrupt the current supply in the closed-circuit line 30.

In order to produce a maintenance-free protective system, it is possible for the fail-safe automation system 12 to check and/or monitor the control relay circuit 34. For this purpose, the output side section 28 of the closed-circuit line 30 between the output of the respective tripping memory 48 and the input to the associated load control unit 20 is connected via a feedback line 50 to an input 52 of the automation system. The signals of each closed-circuit line 30, which may be connected to the input of the load control unit 20, can therefore be processed further by the automation system 12 for checking and for monitoring. The status of each closed-circuit line 30 is therefore available at all times in the automation system 12, and can be indicated by the automation system to the installation operator.

Alternatively or additionally, it is possible to provide for the signal which can be supplied to the actuating element 26 via the tripping line 22, 24 to in each case be fed back to the automation system 12 via a further feedback line 54. This allows the automation system to check the serviceability of the load control units 20, and to indicate the result of the check to the installation operator.

It is also possible to provide how the control relay circuit 34 can be upgraded such that dedicated signals, so-called test signals, can be supplied separately from the automation system 12 to each of the closed-circuit lines 30a, 30b, 30c, 30d in order to switch them such that they are "free of voltage" or "free of current". For this purpose, each series relay 46 in the block protection circuit 51 is connected via a separate test line 56 to an output 42 of the automation system 12. Series relays 47 are also provided for fail-safe protective criteria in the control relay circuit 34 and their exciter inputs 38 are connected to the signal outputs 42 of the automation system 12.

The abovementioned wiring for the protective system 10 results in it having the capability, by means of suitable programming of the fault-free automation system 12, to test each load control unit 20a, 20b and/or each closed-circuit line 30a, 30b, 30c, 30d individually and successively in time for fault-free operation.

The two programs for the automation systems 12, 14 comprise a plurality of logic modules which carry out the individual tasks of signal processing and passing on signals of the operating parameters. The first module 55 processes the signals for fail-safe protective criteria, the second module 57 processes the signals for non-fail-safe protective criteria, and the third module 58 processes the signals for the general start command for the installation "open valve".

Further modules are provided in the program for the automation system 12 in order to carry out the testing and monitoring of the closed-circuit line: a fourth module 63 is used to test the line tripping, a fifth module 65 is used for the automatic reset signal for the tripping memory 48, a sixth module 67 is used for the line status monitoring, and a further module 69 is used for test-signal monitoring on the tripping lines. The modules 63, 65, 67, 69 in this case interact and are able to output and to receive the signals which are required for testing and monitoring of the lines 22, 24, 30.

In order to check the serviceability and soundness of the control relay circuit 34 for the protective system 10, the program for the automation system 12 carries out the steps described in the following text for each of its closed-circuit lines 30a, 30b, 30c, 30d, individually and successfully. The feedback of the signals which occur on the closed-circuit lines 30 into the automation system 12 means that it can test whether there is a defect on one of the closed-circuit lines 30a, 30b, 30c or 30d.

If the aim is to carry out a check during operation of the gas-turbine installation, it is necessary to ensure that the actuating element 26 is connected to the supply voltage via that one of the load control units 20a (or 20b) in the pair, which is not connected downstream from the closed-circuit lines 30c, 30d (or 30a, 30b) to be checked. Otherwise the test would lead to an unplanned shutdown of the gas-turbine installation.

The test procedure, which is stored in machine-legible form in the automation system and can be executed by this, will be described by way of example with reference to the checking of the closed-circuit line 30c:

As an enable condition, it must first be confirmed that the actuating element 26 is being supplied with electrical voltage by that one of the load control units 20a in the pair which is not arranged downstream from the closed-circuit line 30c to be checked, or that this can be done. Furthermore, it is necessary to confirm that the states of the tripping lines 22 and 24 which have been read back into the automation system 12 are identical and that there are no faults in the load control units 20a and 20b. Provided that these enable conditions are satisfied, the automation system switches the output side of the closed-circuit line 30c to be checked such that the voltage is zero, by opening the switching element 40 of one of the associated control relays 36. In this case, that series relay 46 which is closest to the feed to the closed-circuit line 30c and, after the tripping memory 48 has been successfully reset, the series relay 47 for inclusion of the fail-safe protective criteria are operated appropriately and successively from the automation system 12. The "zero-voltage" signal is received by the tripping memory 48 and is "buffer-stored", as a result of which the output-side part 28 of the closed-circuit line 30 "transmits" the "freedom of voltage" to the load control unit 20b. As a result of the lack of voltage at one of the inputs, the associated load control unit 20b is switched to be inactive, once the downstream tripping line 24 disconnects the actuating element 26 from the supply voltage. However, since the actuating element 26 is being supplied with voltage because the closed-circuit lines 30a, 30b of the other load control unit 20a in the pair are intact, the gas-turbine installation still remains in operation despite this "online" check of the closed-circuit line 30c.

As a result of the feedback of the signals of the closed-circuit line 30 and as a result of the feedback of the signals of the tripping line 24, the automation system 12 can determine the signal delay time which has passed between the generation of the test signal by opening of the switching element 40 of one of the control relays 36 and the reception of the subsequent signal, which is arranged downstream, on the closed-circuit line 30c or the tripping line 24. A test signal is generally provided for the period of up to 1 second and is produced by the automation system 12 operating one of the series relays 46. If the automation system 12 does not receive the expected reaction at the output 28 of the closed-circuit line 30c (or on the tripping line 24) within 0.5 seconds, preferably within 0.3 seconds, after the start of the test signal at one of its signal inputs 52, then this is classified as a fault. This is a signal to the installation operator, as a fault message, via an indication which is not shown. In this case, the closed-circuit line 30c, or to be precise the components of the control relay circuit 34 which are located in the closed-circuit line 30c can be checked for a potential short. In this case, each of the control relays 36 can also be checked both on the exciter side and on the switching element side. Furthermore, in this case, corresponding fault messages are produced and stored, and can be reset only by manual operation. The tripping memory 48 is reset automatically by the automation system 12 independently of the identification of a fault, unless the control relay circuit 34 has been tripped in accordance with the regulations. The latter situation is identified by the fact that a defect which has been identified by one of the protective circuits 45, 49 leads to an interruption in one of the closed-current lines 30a or 30b which have availability redundancy with respect to the closed-circuit line 30c to be checked. In consequence, the relevant tripping identification relay 64a does not operate the reset enable relay 62c, as a result of which it, with its make contact which is then open, blocks the reset command via the corresponding line 60 from the signal output of the automation system 12 for the tripping memory 48 of the closed-circuit line 30c. A manual reset signal must then be passed to the tripping memory 48 from a module 71, in order to reset the tripping memory 48.

If the test signal is recorded on its input side by the automation system 12 within the predetermined maximum period of 0.5 seconds or 0.3 seconds, then the closed-circuit line 30c has been tested successfully, without any fault having been detected. In this case, the automatic acknowledgement of the signal which is stored in the closed-circuit line 30c with the respective tripping memory 48 via the corresponding line 60 from the signal output of the automation system 12 is subject to the same conditions as stated above. If the enable conditions relating to the actuating element 26, the tripping lines 22 and 24 as well as the load control units 20a and 20b are still satisfied after the staggered tripping excitation via the series relays 46 and 47, the next closed-circuit line 30d can then be tested.

The test procedure is preferably carried out during operation of the installation, but particularly preferably during the starting phase or during the shutting-down phase of the installation, in order to avoid further endangering the availability of the installation.

Overall, the invention proposes a protective system 10 for an installation in which all the fail-safe and protective circuits 49 with reaction time requirements of greater than 50 milliseconds are passed via a more fail-safe programmable logic automation system 12. Protective circuits 61 which are not fail-safe and have reaction time requirements of more than 50 milliseconds can be processed by the programmable logic automation system 14, which is not more fail-safe. For all of the other protective circuits 45 with reaction time requirements of less than 50 milliseconds, provision is made instead of this for fail-safe control relays 36 to be connected in a configuration which is tolerant to single faults, in which case the automation system 12 can cyclically check or else continuously monitor the operation of the control relay circuit 34, preferably during operation of the installation.

The invention claimed is:

1. A protective system for an installation, comprising:
   an automation system with
   a plurality of signal inputs that receive operating signals, to be monitored, of first operating parameters of the installation, and
   a plurality of signal outputs, wherein a portion of the signal outputs are for indirect control of the installation;
   a load control unit whose input side is coupled to the signal outputs and whose output side is coupled via a tripping line to an actuating element; and
   a control relay circuit having a control relay where the operating signals of further operating parameters are passed to the load control unit, and wherein the control relay circuit is checked by the automation system.

2. The protective system as claimed in claim 1, wherein the first operating parameters are less time-critical protective criteria for the installation, and in which the further operating parameters are highly time-critical protective criteria for the installation.

3. The protective system as claimed in claim 2, wherein the coupling between the signal outputs and the load control unit is produced indirectly via the control relay circuit.

4. The protective system as claimed in claim 3, wherein to form availability redundancy, a pair of load control units that operate separately and have a respective tripping line are provided, and the tripping lines are linked to the actuating element via an OR logic operation.

5. The protective system as claimed in claim 4, wherein the control relay circuit has a closed-circuit line in which switching elements from the control relays in the control relay circuit are provided, and which closed-circuit line is connected to one input of the load control unit.

6. The protective system as claimed in claim 5, wherein to form safety redundancy, the input side of each load control unit in a pair is connected to two separately routed closed-circuit lines that are logically linked in the respective load control unit via an AND logic operation.

7. The protective system as claimed in claim 6, wherein
the control relay circuit has a control relay, which in each case has an exciter input and at least one switching element, per operating signal to be monitored and per closed-circuit line,
the exciter input connected to that signal output of the automation system is associated with the respective operating signal, and
one of the switching elements is provided in the closed-circuit line.

8. The protective system as claimed in claim 7, wherein the output of the relevant closed-circuit line is connected to a signal input of the automation system for signal feedback to the automation system.

9. The protective system as claimed in claim 8, wherein the relevant tripping line is connected to a signal input of the automation system for signal feedback to the automation system.

10. The protective system as claimed in claim 9, further comprising:
a series relay with an exciter input and at least one switching element is provided for each closed-circuit line,
whose switching element is connected to the respective closed-circuit line and whose exciter input is connected to a signal output of the automation system, that supplies a test signal, that is be pre-determinable by the automation system, to the control relay circuit.

11. The protective system as claimed in claim 10, wherein the switching element of the series relay is arranged immediately downstream from a feed point within the closed-circuit line.

12. The protective system as claimed in claim 9, wherein a series relay with an exciter input and a switching element is provided for each closed-circuit line,
whose switching element is connected to the respective closed-circuit line and whose exciter input is connected to a signal output of the automation system, in order to supply those signals which have been processed in the automation system of the first operating parameter.

13. The protective system as claimed in claim 12, wherein
a test signal for the series relay is predetermined by the automation system in order to check the serviceability of the series relay, and
a tripping memory is in each case arranged in the or in each closed-circuit line, and is provided between the switching elements of the control relays of the control relay circuit and the load control unit, where the tripping memory is reset by a reset signal from the automation system.

14. The protective system as claimed in claim 13, wherein a tripping identification relay and a reset enable relay are provided in order to enable the reset signal for the tripping memory, where the tripping identification relay and the reset enable relay are connected on the input side to the closed-circuit lines are not associated with the load control unit which is connected downstream from the relevant tripping memory.

15. A method for checking a control relay circuit in a protective system by an automation system in a protective system, comprising:
checking that a tripping line, which is not connected downstream from a closed-circuit line which is currently intended to be checked, to determine whether the tripping line is supplying electrical voltage to an actuating element;
producing a test signal by the automation system at t=0 seconds by means of one of control relays for the closed-circuit line which is intended to be checked if the actuating element is being supplied with electrical voltage;
recording a signal profile of the closed-circuit line or a signal profile of the tripping line by the automation system; and
determining a state of the control relay circuit by the automation system by assessment of the recorded signal profile over time.

16. The method as claimed in claim 15, wherein a fault state of the control relay circuit is identified, is stored and is signaled by the automation system when the effects of the test signal in the signal profile occur at a time of t=0.5 seconds, or later and the test signal is produced via a series relay.

17. The method as claimed in claim 16, wherein the method is during a starting or a shutting-down phase of an installation.

18. The method as claimed in claim 17, wherein a transmission of the test signal to the closed-circuit line has no effect on the actuating element.

19. The method as claimed in claim 18, wherein a tripping memory arranged in the closed-circuit line is reset by the automation system after determination of the state of the control relay circuit.

20. The method as claimed in claim 19, wherein the reset signal from the automation system is supplied via a combination of the tripping identification relay and the reset enable relay to the tripping memory only when no tripping has occurred in the control relay circuit.

* * * * *